United States Patent Office 3,282,896
Patented Nov. 1, 1966

3,282,896
LINEAR POLYURETHANES FORMED BY REACTING DIMETHYLOL PHENOL WITH A DIISOCYANATE
Fred J. Einberg, Philadelphia, Pa., assignor to the United States of America as represented by the Secretary of the Army
No Drawing. Filed Feb. 6, 1963, Ser. No. 256,772
7 Claims. (Cl. 260—47)

The invention described herein may be manufactured and used by or for the Government for governmental purposes without the payment to me of any royalty thereon.

This invention relates to polyurethanes and particularly to the preparation thereof from polymethylol phenols and phenol ethers and polyisocyanates. The invention also relates to improved polyurethane coating solutions and varnishes and to articles coated therewith.

In the course of the investigation leading to the present invention studies were made of the class of organic compounds known as the polymethylol phenols and phenol ethers. The preparation of this class of compounds is disclosed in the prior art, both in the patent and the publication literature. In this regard, attention is directed to U.S. Patents 2,579,329; 2,579,330; 2,579,331; 2,598,406; 2,606,929; 2,606,935 and publications by Martin, Journal of the American Chemical Society 74, 3024 (1951), and Manasse, Berichte 27, 2409 (1894). Thte polymethylol phenols and phenol ethers are known to be susceptible to self-polymerization and possibly to some unexpected reactions resulting from the reactivity of the contained methylol groups. Therefore, it would not be expected that these compounds would undergo a normal reaction with polyisocyanates to form urethane linkages. Even assuming the possibility of a normal reaction, it would not be expected that polyurethanes of any practical usefulness would result since the identity of solvents and catalysts, the conditions of time and temperature, and the extent of polymerization are unknown quantities.

Accordingly, a principal object of the present invention is to provide a novel polyurethane composition.

Another object of the invention is to provide a method of preparing linear polyurethanes from polymethylol phenols and phenol ethers.

A further object of the invention is to provide a coating solution or varnish comprising a novel polyurethane composition.

Still another object of the invention is to provide an article having a coating comprising a novel polyurethane composition.

Other objects and advantages of the invention will in part be obvious and in part appear hereinafter in the following detailed description of the principles of the invention and several of the embodiments thereof.

The present invention concerns the synthesis of new and useful resins from the reaction of dimethylol phenols, dimethylol phenol ethers or the para substituted forms thereof with diisocyanates. The reaction effects the formation of urethane linkages and results in a highly polymerized composition the molecules of which are predominantly linear. Resultant polyurethane resins are useful for protection coatings, potting compounds and rigid foams.

Polymeric compositions wherein the polyurethane structure predominates have been described in the literature but they have not included the novel polyurethanes of the present invention. For example, the reaction product of phenylisocyanate and phenol-formaldehyde resins has been reported by Keru et al., Die Macromolekular Chemie 8, 252–267 (1952). While the latter product is a polyurethane, nevertheless it is quite different and non-analogous to the reaction product of the invention since the former are polynuclear polymethols having urethane bonds appended to the polymer chain whereas the latter are mononuclear phenols having urethane bonds as part of the chain backbone.

In general, the dimethylol phenols and phenol ethers may be represented by the following structural formulae;

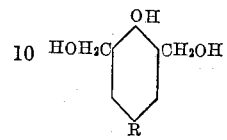  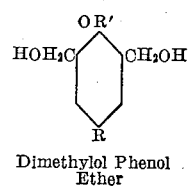

Dimethylol Phenol        Dimethylol Phenol Ether where R is a member selected from the group consisting of hydrogen, an alkyl radical, an aryl radical, and an alicyclic radical and R' is a member selected from the group consisting of an alkyl radical, an allyl radical, and a benzyl radical.

The polyisocyanate employed in the inventive synthesis may be aliphatic or aromatic. Exemplary of the former is hexamethylene diisocyanate, while the latter may be represented by tolylene diisocyanate.

In the practice of the invention linear polyurethanes may be prepared by mixing equimolar quantities of the polyol compound and the polyisocyanate in a suitable solvent, e.g., dioxane, tetrahydrofuran, or dimethylformamide, in the presence of a catalyst, e.g., a tertiary amine or an acetylacetonate salt of a heavy metal. The mixture is stirred while heating to promote interaction, a temperature of about 50° C. for a period up to 96 hours being found suitable. Precipitation of the resultant resins may be effected in water or methyl alcohol, after which the resins may be filtered and dried. Various reactants and conditions utilized in the preparation of the inventive linear polyurethanes as well as physical data of the by-products are set forth in Table I.

Solutions of the inventive polyurethane resins may be employed for coating metal, wood, and other materials. Application of these solutions as thin films results in the formation of hard coatings which are characterized by resistance to abrasion and wear and by resistance to corrosive and atmospheric media. Suitable resin solutions may be prepared by mixing the polyol, after removal of water therefrom, e.g. by an azeotropic procedure, with a solvent such as dry dioxane to which excess diisocyanate has been added, the mol ratio of polyol to diisocyanate being preferably about 1:2. The mixing is carried out under a blanket of dry nitrogen until the resultant exothermic reaction is complete. To avoid discoloration because of oxidation the solution is preferably stored in an hermetic container, a small quantity, e.g., about 1%, of a hindered phenol, e.g., 2,6 di-tert-butyl phenol, being added as an antioxidant. Where the particular polyol employed is a dimethylol phenol, a triol, the mol ratio with regard to diisocyanate is, as aforementioned, preferably about 1:2; where the polyol is a dimethylol phenol ether, a diol, a triol (e.g., 2-hydroxy methyl-2-methyl-1,3-dihydroxypropane) should preferably be employed therewith, the mol ratio of ether to triol to diisocyanate being preferably about 1:1:2.

Coating solutions or varnishes, in accordance with another embodiment of the invention, may be prepared also by mixing the linear polyurethane resins isolated as aforementioned with an epoxy resin in a solvent. A preferred amount of the epoxy resin is about 10 to 50 percent by weight of the polyurethane resin employed. Such varnishes may be applied to metal and baked at high temperature to give hard, abrasion resistant, anti-corrosive and chemically resistant coatings.

TABLE I.—PREPARATION OF LINEAR POLYURETHANES

| Polyol | Polyisocyanate | Solvent | Catalyst | Temp. and Period of Stirring | Dry Product | | Relative Viscosity |
| --- | --- | --- | --- | --- | --- | --- | --- |
| | | | | | Appearance | Observed Solvent | |
| 2,6-dimethylol-p-cresol (8.4 gms.=0.05 mol.). | Tolylene-2,4-diisocyanate (8.7 gms.=0.05 mol.). | Dioxane. (17.1 gms.) | Triethylamine (10 drops of 1% soln. in dioxane). | 50° C., 48 hrs.. | Soft, white powder. (S.R.=155–60° C.) | Acetone, dioxane, tetrahydrofuran, dimethylformamide. | 1.057 (1% dioxane soln.). |
| 2,6-dimethylol-4-methyl methoxybenzene (6.0 gms.=0.033 mol.). | Tolylene-2,4-diisocyanate (5.7 gms.=0.033 mol.). | Dioxane. (11.7 gms.) | Triethylamine (9 drops of 1% soln. in dioxane). | 50° C., 20 hrs.. | Soft, white powder. (S.R.=180–5° C.) | Dioxane, tetrahydrofuran, dimethylformamide. | 1.165 (1% dioxane soln.). |
| Do | do | do | Ferric acetyl acetonate (2 drops of 1% soln. in dioxane). | 50° C., 1 hr. | Soft, white powder. (S.R.=190–200° C.) | Dimethylformamide. | 1.244 (1% dimethylformamide soln.). |
| 2,6-dimethylol-4-methyl methoxybenzene (5.5 gms.=0.03 mol.). | Hexamethylene diisocyanate (5.0 gms.=0.03 mol.). | 25% soln. dioxane. (31.5 gms.) | do | 50° C., 4 days. | Soft, white powder. (S.R.=130–5° C.) | do | 1.358 (1% dimethylformamide soln.). |
| Do | p,p'-Diphenylmethane diisocyanate (7.5 gms.=0.03 mol.). | Dioxane. (13.0 gms.) | do | 50° C., 20 hrs.. | Soft, white powder. (S.R.=155–165° C.) | Dioxane, tetrahydrofuran, dimethylformamide. | |
| 2,6-dimethylol-4-methyl allyloxybenzene (6.2 gms.=0.03 mol.). | Tolylene-2,4-diisocyanate (5.2 gms.=0.03 mol.). | Dioxane. (11.9 gms.) | Triethylamine (9 drops of 1% soln. in dioxane). | 50° C., 4 days. | Soft, white powder. (S.R.=165–70° C.) | Acetone, dioxane, tetrahydrofuran, dimethylformamide. | 1.350 (1% dioxane soln.). |

NOTE.—S.R.=Softening Range.

Pursuant to the foregoing teachings several varnishes were prepared and the details thereof, illustrative of the best mode of practicing the invention, are set forth below.

A varnish was prepared containing the polyurethane reaction product of a dimethylol phenol ether, a triol and an aryl diisocyanate. Prior to initiating reaction an azeotropic procedure was employed to remove water from the polyols. In carrying out this procedure 18.2 grams (0.1 M) of 2,6-dimethylol-4-methylmethoxybenzene, 13.2 grams (0.1 M) of trimethylol propane and 100 milliliters of benzene were refluxed, a drying tube being employed as protection against atmospheric moisture. When the removal of water was no longer in evidence a solution containing 69.6 grams (0.4 M) of toluene diisocyanate and 1% by weight of 2,6-di-tert-butyl p-cresol (an antioxidant) in 400 milliliters of dry tetrahydrofuran was added. The mixture was stirred for 2 hours under a blanket of dry nitrogen and transferred to an hermetically sealed container previously flushed with nitrogen. The resultant varnish was applied as a thin film on steel panels and after drying in air for several days formed a hard coating. Good resistance to weather and chemicals was evidenced upon exposure to various atmospheric conditions and chemical media. Baking at a temperature in the range 100°–150° for ½ to 2 hours produced more resistant coatings in much shorter time.

Other varnishes were prepared by dissolving 10 grams of the dry product prepared as in Examples 1 and 2 of Table I in 20 grams of dimethylformamide, adding thereto 10 grams of an epoxy resin, such as "Epon 828," a diglycidyl ether of bisphenol A, a product of Shell Oil Company, and mixing to obtain substantial homogeneity. When applied as thin coatings to steel and baked at 400° F. for 1 hour the varnishes were observed to resist commercial solvents, weak acids and strong bases. The baked coatings were characterized by good flexibility and adhesion to steel and good stability. In this latter regard no indication of gelling was noted after several weeks at room temperature.

It is expressly understood that the specific embodiments set forth hereinbefore are not to be construed as limiting the present invention in any respect and are presented for purposes of explanation and illustration and that various modifications of the invention without departing from the spirit and scope thereof may be otherwise embodied or practiced.

Having thus described the invention so that others skilled in the art may be able to understand and practice the same, I state that what I desire to secure by Letters Patent is defined in what is claimed.

I claim:

1. A polyurethane composition consisting essentially of the reaction product of, as sole reactants, equimolar quantities of a diisocyanate with a compound selected from the group consisting of a mononuclear dimethylol phenol and a mononuclear dimethylol phenol ether.

2. A polyurethane composition according to claim 1 wherein said mononuclear dimethylol phenol has the general formula

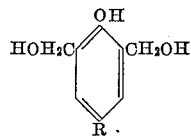

and said mononuclear dimethylol phenol ether has the general formula

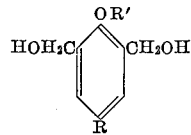

where R is a member selected from the group consisting of hydrogen, an alkyl radical, an aryl radical, and an alicyclic radical and R' is a member selected from the group consisting of an alkyl radical, an allyl radical, and a benzyl radical.

3. A method of preparing linear polyurethanes comprising mixing, as sole reactants, equimolar quantities of a compound selected from the group consisting of mononuclear dimethylol phenols and mononuclear dimethylol phenol ethers with an organic diisocyanate in a solvent selected from the group consisting of dioxane, tetrahydrofuran and dimethylformamide in the presence of a suitable catalyst for a period ranging between about 1 to 96 hours while maintaining the mixture at a temperature of about 50° C., and isolating the resultant polymer.

4. A coating solution comprising a polyurethane composition according to claim 1 dissolved in a solvent therefor.

5. A coating solution comprising a polyurethane composition according to claim 2 dissolved in a solvent therefor.

6. An article comprising a structure having thereon a coating comprising a polyurethane composition according to claim 1.

7. An article comprising a structure having thereon a coating comprising a polyurethane composition according to claim 2.

References Cited by the Examiner

UNITED STATES PATENTS

| 2,349,756 | 5/1944 | Pratt | 260—77.5 |
| 2,719,831 | 10/1955 | Craemer et al. | 260—77.5 |
| 3,148,167 | 9/1964 | Keplinger | 260—858 |
| 3,177,090 | 4/1965 | Bayes et al. | 260—831 |

OTHER REFERENCES

Carswell, T. S., Phenoplasts, High Polymers, vol. VII, Interscience Publishers, N.Y., 1947, TP 986 P4 C3, pp. 9–12.

MURRAY TILLMAN, *Primary Examiner.*

SAMUEL H. BLECH, *Examiner.*

J. C. BLEUTGE, *Assistant Examiner.*